United States Patent [19]

Azarowicz

[11] 3,899,376

[45] Aug. 12, 1975

[54] PROCESS OF USING A MICROBIAL DEGRADATION FACILITY

[75] Inventor: Edward N. Azarowicz, Vienna, Va.

[73] Assignee: Bioteknika International, Inc., Alexandria, Va.

[22] Filed: Feb. 23, 1973

[21] Appl. No.: 334,986

[52] U.S. Cl.......195/2, 195/3 H, 195/28 R, 210/11 210/15
[51] Int. Cl..........................................C12b 1/00
[58] Field of Search......195/2, 34, 28 R, 139–144; 210/11, 15, DIG. 21

[56] References Cited
UNITED STATES PATENTS

| | | | |
|---|---|---|---|
| 3,725,258 | 4/1973 | Spector et al. | 210/15 |
| 3,580,840 | 5/1971 | Uridil | 210/11 |
| 3,547,813 | 12/1970 | Robinson et al. | 210/15 |
| 3,152,983 | 10/1964 | Davis et al. | 210/15 |

*Primary Examiner* — A. Louis Monacell
*Assistant Examiner* — R. B. Penland
*Attorney, Agent, or Firm* — Raymond C. Stewart et al.

[57] ABSTRACT

A facility for the microbial degradation of petroleum and oily wastes, as contained in, e.g., industrial effluent discharge materials, comprising an interconnected initial and final degradation system, each of which contains at least one tank means, associated inlet and outlet means, conveying means, aeration or stirring means and drainage means. The effluent to be degraded is introduced into the initial degradation system together with the microorganisms employed and nutrients therefor, and degradation proceeds with aeration or stirring with the formation of a protein-containing cell mass. The substantially degraded effluent is conveyed to the final degradation system where additional microorganisms are added to obtain the final degradation or polishing. The resulting effluent, after filtering, is clean and clear and may be discharged safely into the environment.

22 Claims, 3 Drawing Figures

PROCESS OF USING A MICROBIAL DEGRADATION FACILITY

BACKGROUND OF THE INVENTION

This invention relates to a facility for effecting the microbial degradation of crude petroleum, various oil fractions, oily wastes, polychlorinated biphenyls and other organic contaminants, such as DDT. More particularly, it relates to an apparatus and a procedure for effectively conducting the microbial degradation of polluting contaminants.

Environmental cleanup is of much concern to the country and to the world today. Air, water and land pollution are major problems in today's technological society. Although many proposals and techniques have been advanced for solving these problems, such as the question of cleaning industrial effluent waste materials, little progress has been made toward a solution in an economically feasible and commercially acceptable manner. In copending application Serial No. 43,226, filed on June 3, 1970, entitled "Microbial Degradation of Petroleum", now U.S. Pat. 3,769,164, issued Oct. 30, 1973, and in copending application Ser. No. 242,192, filed Apr. 7, 1972, entitled "Microbial Degradation of Polychlorinated Biphenyls", now U.S. Pat. 3,779,866, issued Dec. 18, 1973, there are described methods for degrading various organic pollutants and contaminants employing nonpathogenic, hydrocarbon-utilizing microorganism strains. This technique has become accepted and generally recognized as an economically attractive and effective means for solving the problems of oil spill and industrial effluent contamination.

One of the objects of the present invention is to provide an apparatus for effectively conducting the process of microbial degradation of various organic pollutants, such as petroleum, oily wastes, polychlorinated biphenyls and the like.

Another object of the present invention is to provide a procedure for effectively conducting microbial degradation of contaminating materials in an efficient and relatively simple manner.

A further object of the invention is to provide a facility and method for the rapid degradation of various organic pollutants.

These and other objects and advantages of the present invention will become apparent to those skilled in the art from a consideration of the following specification and claims, taken in conjuction with the accompanying drawings.

SUMMARY OF THE INVENTION

In accordance with the present invention, it has been found that a multi-tank system comprising a plurality of tank units interconnected by piping means for providing appropriate aeration as well as pump means for the transfer of effluent material from one tank to the next can be used for effectively meeting the objectives outlined above. Alternatively, a single tank unit may be used for cleaning up pollutants contained in closed containers, such as, for example, tanker bottoms or storage tanks containing crude petroleum, heavy tar fractions, asphalts, viscous crude oil residues, or other petrochemical or organic pollutants.

BRIEF DESCRIPTION OF THE DRAWINGS

The present invention will become more fully understood from the detailed description given hereinbelow and the accompanying drawings, which are given by way of illustration only and thus are not limiting of the present invention and wherein.

DESCRIPTION OF THE PREFERRED EMBODIMENTS

Figure 1:
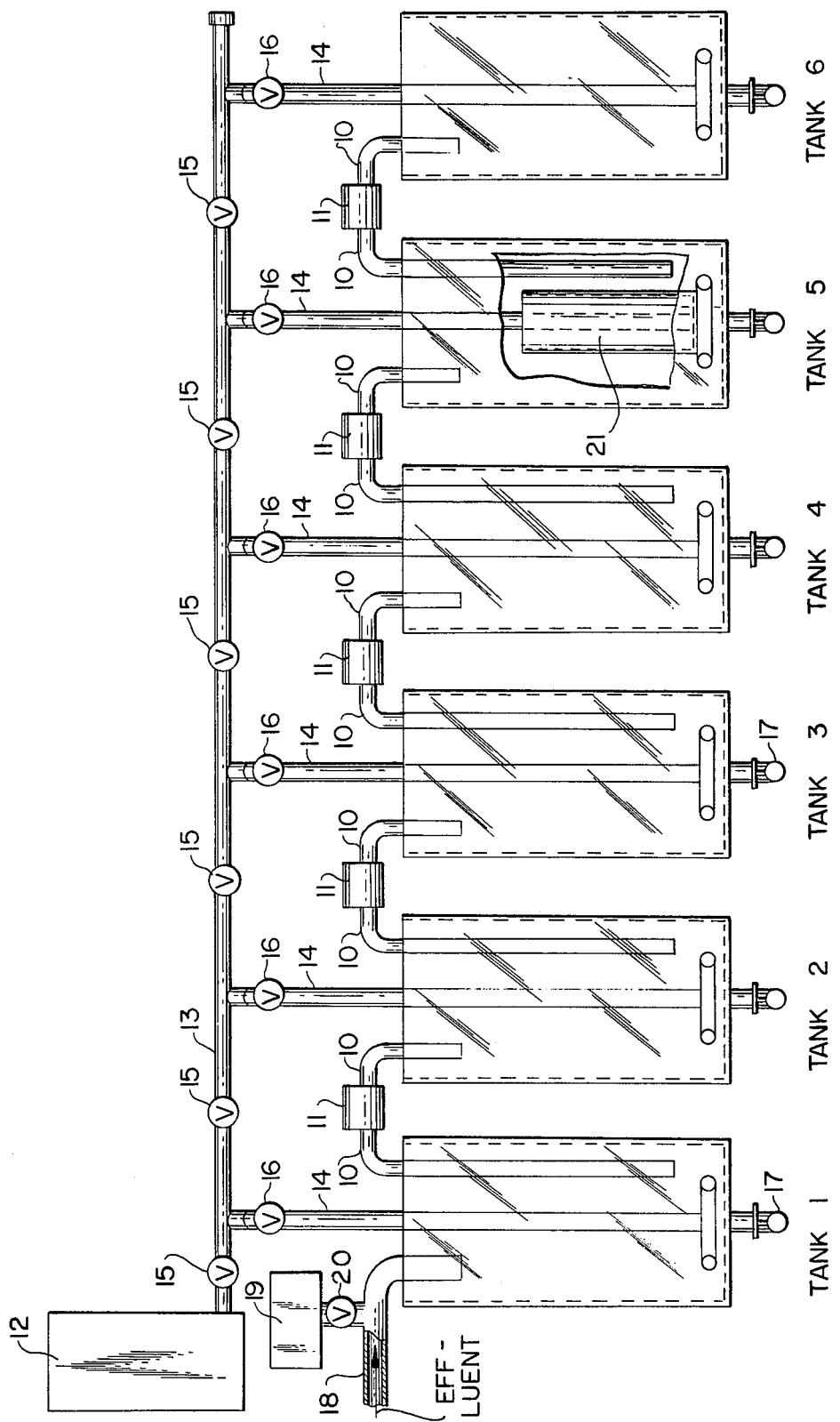
FIG. 1 is a schematic view of a Microbial Degradation Facility containing six tank units.
Figure 2:
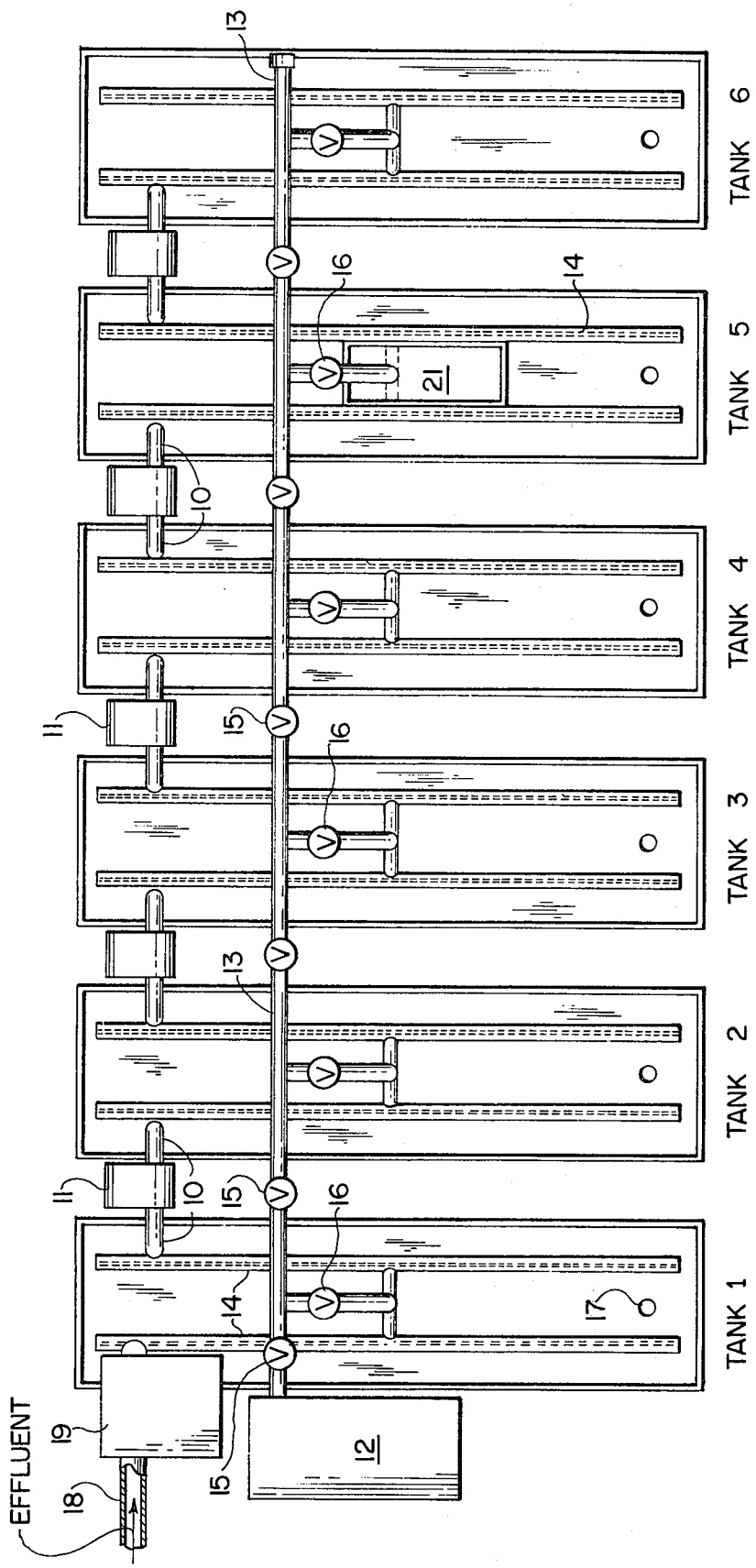
FIG. 2 is a schematic top view of the Microbial Degradation Facility shown in FIG. 1.

Referring now to the drawings, wherein the same reference numerals are used throughout the various figures to designate the same elements, the Microbial Degradation Facility of FIGS. 1 and 2 comprises tanks 1, 2, 3, 4, 5 and 6 as the basic units thereof. These tanks may be made of any suitable material, for example, metals which are not detrimental to the microbial degradation action, such as stainless steel or aluminum, glass or a synthetic resin such as polystyrene, acrylonitrile-butadiene styrene resin, polyethylene, and the like. Moreover, the tank units may comprise natural or man-made lagoons, earthen, metal or concrete holding means, lined if necessary with, e.g., a synthetic resin, or any other convenient holding or storage structure. While the illustrations herein show six and two tanks, respectively, it is to be understood that the number of tanks or tank means may be varied in accordance with the process conditions and the nature of the material to be degraded so that, as a general proposition, it can be stated that a multi-tank system, i.e., comprising a plurality of tank units, is employed and that the specific number thereof is merely dependent upon the desired results.

An air compressor 12 provides air through valves 15 into air line 13 for supply to the individual air lines 14 through valves 16 to each of tanks, 1, 2, 3, 4, 5 and 6, as needed or desired. This aeration provides the mixing action needed for the microbial degradation procedure. Pump means 11 is provided for transfer of material from tank to tank through pipes 10. A drain means 17 is provided at the bottom of each tank for removing the obtained cell mass as well as any remaining water, effluent or the like. The effluent to be treated is added to tank 1 through pipe means 18, and the microorganisms are either added through the same means from supply tank 19 through valve 20 or independently therefrom through a separate supply line.

Using the tank system shown in FIGS. 1 and 2 as a specific example, tank 1, which may be of any desired capacity, is charged with a mixture comprising 25% by volume of organic contaminants, including oil, emulsifiers, a biocide and an algicide, and 75% by volume of water. Aeration is initiated through pipe 14, and approximately 2% by volume of a slurry of the nonpathogenic, cell-mass producing, hydrocarbon-utilizing microorganism strains are added thereto. The microorganisms are added to tank 1 in the form of an aqueous mixture which includes sources of nitrogen and phosphorus, for example, cottonseed protein and inorganic salts of nitrogen and phosphorus. The process is conducted at room temperature. Degradation of the organic pollutants is permitted to continue in tank 1 for approximately 60 hours.

At the end of 60 hours, the mixture is transferred to tank 2 which contains an equal amount of water, thereby providing about a 50% dilution. Aeration is continued, and microbial degradation is permitted to continue in tank 2 for 36 hours for a total of 96 hours (about 4 days). It is only necessary to continue the aeration in the specific tank where the degradation is taking place, and valves 15 and 16 are provided within pipes 13 and 14 to shut off or to permit the flow of air into any particular tank. Normally, ambient air is used for the aeration, but it is quite feasible to use, for example, oxygen or hydrocarbon-containing air. The cell mass formed in tank 1 settles out, and this mass can be removed mechanically, for example, by flushing tank 1 and permitting the cell mass to wash through drain 17 or merely by scooping it out after the effluent has been pumped into tank 2.

At the end of 96 hours, approximately 50% of the resulting mixture in tank 2 is transferred into an equal volume of water contained in tank 3. Degradation is allowed to proceed in tank 3 for an additional 24 hours for a total elapsed time of about 120 hours or approximately 5 days. Hexane extracts taken from tank 3 show that no oil is present in this tank after degradation has been permitted to proceed for 5 days.

After 120 hours, 50% of the mixture in tank 3 is transferred into an equal volume of water contained in tank 4, and also, the mixture remaining in tank 2 is transferred into the remaining mixture in tank 3. Hence, at this point, tanks 3 and 4 both contain approximately the same quantity of mixture. Degradation is allowed to proceed in tanks 3 and 4 for approximately 12 hours, a total elapsed time of 5½ days.

After 132 hours, approximately 40 to 50% of the volume of tank 4 is transferred into an approximately equal volume of water contained in tank 5, and approximately 50% of the volume of mixture in tank 3 is transferred into the remaining mixture in tank 4. Tank 5 contains filter 21. Filter 21 is a recirculating filter, for example, containing sand and gravel, which serves to remove any solids from the treated water, thereby clarifying it. The residence time in tank 5 containing recirculating filter 21 is about 12 hours, for a total of approximately 144 hours (6 days).

After 144 hours of treatment, the clean, filtered water may be discharged as desired, for example, into a lake or stream. Tank 6 could be this lake or stream, or tank 6 could be an actual holding tank. At 144 hours, the mixture remaining in tank 3 is transferred into tank 4, and an appropriate quantity of mixture is transferred into tank 5 to be circulated through filter 21. After remaining in tank 5 for approximately 12 hours, the clean output is transferred into tank 6 or is discharged as desired, and the remaining mixture in tank 4 is transferred into tank 5 for recirculation through the filter. At the end of 168 hours (7 days), all of the mixture has passed through the filter in tank 5 and can be discharged as desired. Accordingly, at the end of approximately 7 days, the polluted mixture added to tank 1 has been completely degraded and transformed into clean water which may be reused, recycled or discharged into any natural body of water. Fish, benthic life, microscopic life and aquatic plants placed in tank 6 will grow, survive and proliferate in a natural manner, thus indicating that the polluted water has been degraded to a habitable, ecologically-clean environment by treatment in the described microbial degradation facility.

The procedure may be conducted in a batch-wise manner as described above. Alternatively, the procedure may be conducted in a continuous manner wherein additional pollutant-containing water may be added to tank 1 after it has been emptied and a previous cycle is in operation. The tanks shown herein may be of small scale, such as a capacity of approximately 100-200 liters, or they may be of very large scale, such as the holding tanks found in industry comprising thousands of gallons of capacity. In either case, the principles outlined herein remain the same. The amount of residence time in each tank and the time of transfer from tank to tank may be varied in dependence upon the nature of the pollutants to be degraded, the size of the tanks and the particular microorganisms employed.

Figure 3:
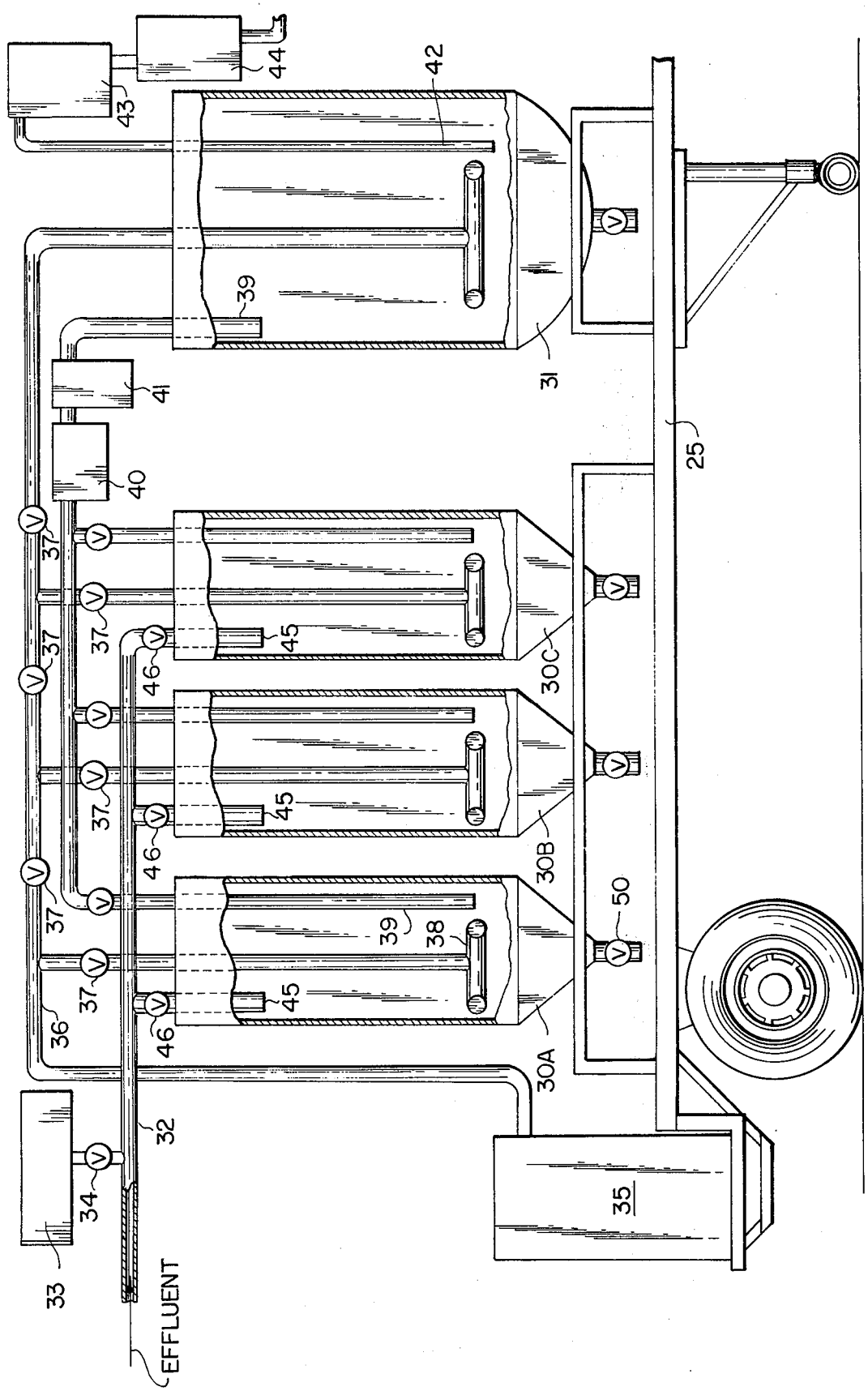
FIG. 3 is a schematic view of another embodiment of the Microbial Degradation Facility containing two tank units and associated equipment.

FIG. 3 shows a mobile microbial degradation facility basically comprising two tank units. The first tank means comprises tanks 30A, 30B and 30C, which enables a continuous operation since degradation in this unit is designed to proceed for 3 days in the first tank means and for 1 day in the second tank means 31. Tank 31 may be designed to receive effluent from more than one series of first-tank units if necessary or desired. The effluent to be degraded enters tank 30A, for example, by way of inlet pipe means 32 and through valve 46 and pipe 45. Similarly, valves 46 and pipes 45 are provided in tanks 30B and 30C to permit entry of effluent therein when appropriate. The degrading microorganism mixture, including appropriate nutrient sources, is added to inlet means 32 through valve 34 from supply tank 33. Alternatively, the microorganisms may be added directly to tanks 30A, 30B and 30C at the appropriate time. Aeration is supplied from air compressor 35 or another suitable source through air line 36 through valves 37 into air outlet means 38, which comprises pipes containing holes for emitting the air under the surface of the liquid to provide aeration and mixing of the material being degraded. Alternatively, stirring means, not shown, may be employed to provide sufficient turbulence and mixing and oxygen aeration at the surface of the liquid from the ambient air. Pipe means 39 is provided from each tank to tank 31 for pumping the degraded effluent by means of pump 40 from tanks 30A, 30B and 30C into tank 31. An in-line filter 41 may be employed to remove any suspended solids from the degraded effluent, but this embodiment is optional depending upon the circumstances. Pipe means 42 is provided in tank 31 to convey the clean effluent for discharge by means of pump 43. A filter 44 is used in this line to remove any suspended solids, e.g., left-over cell mass, before discharge of the water into, for instance, a river or stream. Although the effluent at this point is free of the contaminating pollutants present in the material as it entered through inlet means 32, nevertheless the use of a filter 44 is preferred to obtain clarification and a more aesthetically pleasing degraded effluent.

Although the unit in FIG. 3 is pictured as being positioned on a truck trailer 25, it is to be understood that the unit can be built on, for example, skids or as a permanent installation. Tanks 30A, 30B, 30C and 31 may comprise, e.g., holes in the ground lined with an appropriate material.

The cell mass produced during the degradation procedure is removed through valves 50 since it tends to settle to the bottom of each tank when the aeration or stirring is discontinued. Alternatively, the cell mass can be pumped out of each tank.

The operation of the facility shown in FIG. 3 is conducted continuously by filling tank 30A with the material to be degraded, diluted if necessary by means of a water inlet (not shown); dilution may also be effected in a tank upstream of inlet means 32 which is independent of the microbial degradation system of the invention. The water used for dilution can be recirculated from the outlet of the microbial degradation facility of the invention, or fresh water can be used for this purpose. The microorganism mixture is added to tank 30A, and aeration or stirring of the mixture is then initiated. On the beginning of the second day, effluent is added to tank 30B through inlet 32 from, for example, a holding tank outside of the system and microbial degradation is initiated therein. Similarly, effluent is added to tank 30C at the beginning of the third day and degradation is begun therein. Degradation proceeds in each of tanks 30A, 30B and 30C for three days. Accordingly, at the beginning of the fourth day, the mostly degraded effluent is transferred from tank 30A to tank 31 for final polishing where it remains for 1 day; additional microorganisms and nutrients as well as water (for dilution) may be added to tank 31, if necessary or desirable. Tank 30A is refilled with fresh effluent after removing the cell mas therefrom, and at the beginning of the fifth day, the effluent is discharged from tank 31, whereby the degraded effluent from tank 30B is conveyed to tank 31 for final polishing and degradation for 1 day. At the same time fresh effluent is added to tank 30B for a degradation residence time of 3 days. In a similar manner fresh effluent to be degraded is added each day to tank 30A, 30B or 30C for a residence time of 3 days, and each day the degraded effluent from tank 30A, 30B or 30C is transferred to tank 31, from where it is discharged after a residence time of 1 day. In this way a continuous system is provided, the capacity of which can be tailored to the needs of the user by an appropriate choice of the size of the tanks. For example, the system shown in FIG. 3 can be used to degrade waste effluent containing 10,000 p.p.m. of oil (1% oil) at the rate of 1,000 gallons per day using tanks 30A, 30B and 30C having a capacity of 3,000 gallons each (to provide the necessary dilution capability and safety factor) and tank 31 with a capacity of from 3,000 gallons to 10,000 gallons, the latter being employed if more than one series of tanks 30A, 30B and 30C is used in the system.

The procedure of the present invention is effective for degrading petroleum as well as other industrial wastes in general, such as effluents from food canning or preparing factories, paper mills, dairies and chemical plants discharging solvents, plasticizers, alcohols, aldehydes, ketones, organic acids, phenolics and other cyclic compounds into the environment. The expression "petroleum" as used herein is intended to designate crude petroleum as well as petroleum fractions and petroleum-derived products, such as aliphatic and aromatic hydrocarbons, alcohols, aldehydes, ketones, organic acids, phenols, naphthalenes, phenanthrenes, anthracenes, esters, etc. Thus, the term "petroleum" as used herein refers to organic carbon-containing compounds, including straight- and branched-chain alkanes (including paraffins of varying molecular weights) and other aliphatic compounds (including alicyclics such as cyclohexane) as well as aromatic heterocyclic and carbocyclic compounds.

The process involved in the present invention is a purely biological process in which selected bacteria, actinomycetes, yeasts and filamentous fungi break down the crude petroleum, oily waste or other organic contaminants and convert these pollutants into edible, nontoxic living cells. Depending upon the particular microorganisms used, the procedure of the invention can also be used to microbially degrade polychlorinated biphenyls (PCBs), which have been found to be persistent contaminants in the environment, as well as similar organic pollutants.

The following microorganisms, fully describe in copending application Ser. Nos. 43,226 and 313,629 (filed Dec. 11, 1972) may be used in the microbial degradation facility of the invention:

Candida parapsilosis ATCC 20246
Candida tropicalis ATCC 20247
Candida utilis ATCC 20248
Aureobasidium pullulans ATCC 20249
Myrothecium verrucaria ATCC 20250
Cladosporium cladosporioides ATCC 20251
Saccharomyces cerevisiae ATCC 20252
Aspergillus sp. ATCC 20253
Rhodotorula sp. ATCC 20254
Candida lipolytica ATCC 20255, 20362, 20363, 20364
Nocardia corallina ATCC 21504
Nocardia globerula ATCC 21505
Nocardia globerula ATCC 21506
Nocardia opaca ATCC 21507
Nocardia rubra ATCC 21508
Nocardia paraffinae ATCC 21509
Penicillium sp. ATCC 20369

These microorganisms may be used either singly or in various mixtures of two or more for the degradation procedure, and the particular mixture of microorganisms used is determined by a routine screening procedure which may be conducted, for example, in flasks on a standard laboratory shaker. The particular mixture of microorganisms used will, of course, depend upon the nature of the contaminants contained in the polluted water.

The microorganisms or mixture of microorganisms is advantageously added to the microbial degradation facility in slurry form in an amount of about 1% to 5%, preferably 2%, by volume to the aqueous solution contained in the first tank. A balanced nutritional medium, including inorganic nitrogen and phosphorus nutrients, is advantageously provided for the microorganisms employed. Since the additives used are of agricultural or forest sources, they are safe and nontoxic. A typical nutrient medium included with the slurry of microorganisms is as follows:

| | |
|---|---|
| Yeast-nitrogen base (Difco) | 0.1 g. |
| Yeast extract (Difco) | 0.1 g. |
| Peanut oil (0.2%) | 2.0 ml. |
| MgSO$_4$ | 0.02 g. |
| CaCl$_2$ | 0.002 g. |
| KH$_2$PO$_4$, Monobasic | 0.1 g. |
| K$_2$HPO$_4$, Dibasic | 0.1 g. |
| NH$_4$NO$_3$ | 0.1 g. |
| FeCl$_3$ | 0.005 g. |
| Bromthymol blue | 0.008 g. |
| Distilled water | to make 1000 ml. |

Hence, as a nitrogen source, various kinds of inorganic or organic salts or compounds, such as urea or ammonium salts such as ammonium chloride, ammonium sulfate, ammonium nitrate, ammonium phosphate, etc., or one or more than one amino acid or crude protein mixed in combination, or natural substances containing nitrogen, such as cornsteep liquor, cottonseed protein, yeast extract, meat extract, fish meal, peptone, bouillon, casein hydrolysates, peanut oil, fish solubles, rice bran extract, etc., may be employed. These substances may be used either singly or in combinations of two or more.

Inorganic compounds which may be used as additive substances include magnesium sulfate, sodium phosphate, potassium dihydrogen phosphate, potassium monohydrogen phosphate, iron sulfate or other iron salts such as ferric trichloride, manganese chloride, calcium chloride, sodium chloride, ammonium nitrate, etc.

Accordingly, it can be seen that the entire procedure is safe and nontoxic since the microorganisms themselves as well as the additive nutrients are not toxic to humans, animals or fish.

Although it is preferable to conduct the procedure at ambient temperature, the process is applicable from just above freezing temperature (about 4°C.) to about 37 or 39°C., depending upon the nature of the microorganisms employed. Of course, complete degradation may take a longer time, the lower the temperature. It is not required to use a slurry of microorganisms as described above, and the microorganisms can be added to the first tank as a foam or in a powdered or pelletized form with added nutrients.

Aeration of the degrading mixture inside the tanks is usually sufficient to provide enough stirring action; however, it is quite possible to include stirrers within the tanks to help accelerate the degrading action of the microorganisms. Another way of accelerating the degrading action is to add additional microorganism cultures and additive nutrients to the subsequent tank or tanks upon the transfer of the mixture from one tank to the next. The cell mass which results from the degradation action is mechanically removed from the tanks after the transfer of the degrading mixture therefrom. Basically, this can be done by pumping or flushing, depending upon the size of the tanks.

In any event, the end result of the invention is the conversion of dirty and polluted water into clean water which may be discharged or recirculated as desired, which discharged water will meet any federal or state water quality standards.

EXAMPLES OF THE INVENTION

The following examples are given merely as illustrative of the present invention and are not to be considered as limiting.

EXAMPLE 1

Using a microbial degradation facility containing two tanks and an in-line filter downstream of the second tank, the following mixture is added to the first tank in the system:

6 l. degraded effluent from a previous run (recirculated)
16 l. aged tap water
16 l. industrial oily effluent
2 l. of slurry containing *Penicillium sp.* Bl 3005 ATCC 20369 and 142.2 g. of an aqueous mixture of salts*

40 liters Total

* Mixture comprising 0.2 g. MgSO$_4$ · 7H$_2$O, 0.2 g. CaCO$_3$, 1.0 g. KH$_2$PO$_4$, 1.0 g. K$_2$HPO$_4$, 1.0 g. NH$_4$NO$_3$, 0.01 g. Dayno Sea Salts and 0.1 g. cottonseed protein in 1000 ml. of tap water.

Aeration is provided to tank 1 and the microbial degradation is permitted to proceed for 72 hours. A large cell mass growth is observed after several hours, and the amount of cell mass continues to increase with time. After 72 hours the air is shut off to tank 1, and 31 liters of the degraded material is pumped over to tank 2, which contains 40 liters of aged tap water. A slurry of 0.5 l. of *Candida lipolytica* ATCC 20362, 0.5 l. of *Saccharomyces cerevisiae* ATCC 20252 and 40.0 g. of the salt mixture described above is also added to tank 2, and aeration is started therein. The 9 l. of residue in tank 1, mainly consisting of cell mass, is removed through the bottom drain. The degradation or polishing of the effluent in tank 2 is continued for 24 hours, and then the treated effluent is passed through a sand-gravel filter to give clear water which will support marine life.

EXAMPLE 2

The first tank of a microbial degradation facility containing two tanks for degradation is filled with the following mixture:

22 l. aged tap water
16 l. industrial oily effluent
2 l. of slurry containing *Penicillium sp.* Bl 3005 ATCC 20369 and 142.2 g. of an aqueous solution of the mixture of salts described in Example 1.

40 liters Total

Aeration is provided to tank 1 and the microbial degradation is permitted to proceed for 72 hours. A large cell mass growth is observed after several hours, and the amount of cell mass continues to increase with time. After 72 hours the air is shut off to tank 1, and 31 liters of the degraded material is pumped over to tank 2, which contains 40 liters of aged tap water. A slurry of 0.5 l. of *Candida lipolytica* ATCC 20362 and 0.5 l. of *Saccharomyces cerevisiae* ATCC 20252 is also added to tank 2 to give a final volume of 72 liters, and aeration is then provided to tank 2. After 21 hours, 34 liters of the treated effluent in tank 2 is pumped into a tank containing a recirculating filter and 36 liters of aged tap water. Filtering is continued for 48 hours and 34 liters of the resulting clear water is added to a fish tank. Then, 32 liters of the remaining treated effluent in tank 2 is pumped into the tank containing the recirculating filter and, after 24 hours, is also added to the fish tank. The degraded effluent continues to support fish and plant life for months thereafter.

The invention being thus described, it will be obvious that the same may be varied in many ways. Such variations are not to be regarded as a departure from the spirit and scope of the invention, and all such modifications as would be obvious to one skilled in the art are intended to be included herein.

I claim:

1. a process for the microbial degradation of polluting petroleum and oily wastes which comprises introducing an aqueous mixture of the effluent material to be degraded and at least one microorganism selected from the group consisting of *Candida parapsilosis* ATCC 20246, *Candida tropicalis* ATCC 20247, *Candida utilis* ATCC 20248, *Aureobasidium pullulans* ATCC 20249, *Myrothecium verrucaria* ATCC 20250, *Cladosporium cladosporioides* ATCC 20251, *Saccharomyces cerevisiae* ATCC 20252, *Aspergillus sp.* ATCC 20253, *Rhodotorula sp.* ATCC 20254, *Candida lipolytica* ATCC 20255, *Candida lipolytica*, ATCC 20362, *Candida lipolytica* ATCC 20363, *Candida lipolytica* ATCC 20364, *Nocardia corallina* ATCC 21504, *Nocardia globerula* ATCC 21505, *Nocardia globerula* ATCC 21506, *Nocardia opaca* ATCC 21507, *Nocardia rubra* ATCC 21508, *Nocardia paraffinae* ATCC 21509 and *Penicillium sp.* ATCC 20369, or mutants thereof, together with necessary nutrients for the microorganisms into an initial degradation system, aerating or stirring the mixture in the initial degradation system until the microbial action has proceeded sufficiently to substantially degrade the pollutants in said effluent, conveying the substantially degraded effluent to a final degradation system and adding a fresh charge of at least one of said microorganisms together with nutrients therefor to the final degradation system for a time sufficient to permit the microbial action to proceed to the point where the desired degradation is obtained, and conveying the degraded effluent from said final degradation system.

2. The process of claim 1, wherein the fresh charge of microorganisms added to the final degradation system comprises microorganisms different from those introduced into the initial degradation system.

3. The process of claim 2, wherein the microorganisms introduced into the initial degradation system is *Penicillium sp.* ATCC 20369 and the microorganisms added to the final degradation system comprises a mixture of *Candida lipolytica* ATCC 20362 and *Saccharomyces cerevisiae* ATCC 20252.

4. The process of claim 1, wherein the initial degradation system comprises a plurality of tank means.

5. The process of claim 4, wherein the final degradation system comprises a plurality of tank means.

6. The process of claim 1, wherein the final degradation system comprises a plurality of tank means.

7. The process of claim 1, wherein the resulting cell mass is removed from the initial and the final degradation systems after the completion of microbial action in each.

8. The process of claim 1, further comprising the step of filtering the effluent between the initial and final degradation systems.

9. The process of claim 1, further comprising the step of filtering the degraded effluent downstream of the final degradation system.

10. The process of claim 9, further comprising the step of filtering the effluent between the initial and final degradation systems.

11. The process of claim 1, wherein the steps of the process are repeated so as to provide a continuous degradation of effluent material and discharge of clean, degraded effluent into and out of the system.

12. The process of claim 1, wherein the microorganisms are introduced or added to the effluent material to be degraded in slurry form.

13. The process of claim 1, wherein the microorganisms are introduced or added to the effluent material to be degraded in the form of a foam.

14. The process of claim 1, wherein the microorganisms are introduced or added to the effluent material to be degraded in the form of a powder.

15. The process of claim 1, wherein the microorganisms are introduced or added to the effluent material to be degraded in pelletized form.

16. A process for the microbial degradation of polluting petroleum and oily wastes which comprises treating the petroleum and oily wastes with *Penicillium sp.* ATCC 20369 or a mutant thereof for a sufficient time until the treated petroleum or oily wastes have been substantially degraded.

17. The process of claim 16, wherein the microorganism is mixed with a cellulosic material.

18. The process of claim 16, wherein the microorganism is mixed with a cellulosic material, a nitrogen source and a phosphorus source.

19. The process of claim 18, wherein said nitrogen source is cottonseed protein.

20. The porcess of claim 16, wherein the microorganism is employed in a slurry form.

21. The process of claim 16, wherein the microorganism is employed in a pelletized form.

22. The process of claim 16, wherein the microorganism is employed in a powdered form.

* * * * *